US010869013B2

(12) United States Patent
Yun

(10) Patent No.: US 10,869,013 B2
(45) Date of Patent: Dec. 15, 2020

(54) METHOD AND APPARATUS FOR BUFFER MANAGEMENT IN CLOUD BASED VIRTUAL REALITY SERVICES

(71) Applicant: FOUNDATION FOR RESEARCH AND BUSINESS, SEOUL NATIONAL UNIVERSITY OF SCIENCE AND TECHNOLOGY, Seoul (KR)

(72) Inventor: Ji Hoon Yun, Seoul (KR)

(73) Assignee: FOUNDATION FOR RESEARCH AND BUSINESS, SEOUL NATIONAL UNIVERSITY OF SCIENCE AND TECHNOLOGY, Seoul (KR)

( * ) Notice: Subject to any disclaimer, the term of this patent is extended or adjusted under 35 U.S.C. 154(b) by 0 days.

(21) Appl. No.: 16/515,175

(22) Filed: Jul. 18, 2019

(65) Prior Publication Data

US 2020/0162712 A1    May 21, 2020

(30) Foreign Application Priority Data

Nov. 15, 2018   (KR) .................. 10-2018-0140596

(51) Int. Cl.
| | |
|---|---|
| *H04N 7/18* | (2006.01) |
| *H04N 13/111* | (2018.01) |
| *H04N 13/264* | (2018.01) |
| *H04N 13/156* | (2018.01) |
| *H04N 13/194* | (2018.01) |
| *H04N 13/279* | (2018.01) |
| *H04N 13/00* | (2018.01) |

(52) U.S. Cl.
CPC ......... *H04N 13/111* (2018.05); *H04N 13/156* (2018.05); *H04N 13/194* (2018.05); *H04N 13/264* (2018.05); *H04N 13/279* (2018.05); *H04N 2013/0085* (2013.01)

(58) Field of Classification Search
CPC .. H04N 13/111; H04N 13/279; H04N 13/156; H04N 13/194; H04N 13/264; H04N 2013/0085
USPC ......................................................... 348/43
See application file for complete search history.

(56) References Cited

U.S. PATENT DOCUMENTS

| | | | | |
|---|---|---|---|---|
| 2014/0267637 | A1* | 9/2014 | Hoberman | ............ G06F 1/1626 348/53 |
| 2017/0285758 | A1* | 10/2017 | Hastings | ............. G06F 3/04842 |
| 2017/0295057 | A1* | 10/2017 | Dost | ........................ H04W 4/70 |

(Continued)

OTHER PUBLICATIONS

Alvarez et al, An edge-to-cloud virtualized multimedia service platform for 5G networks (Year: 2019).*

*Primary Examiner* — Shan E Elahi
(74) *Attorney, Agent, or Firm* — Sughrue Mion, PLLC

(57) ABSTRACT

Provided is a method for creating a virtual reality content, storing the virtual reality content in a transmission buffer, and after that, managing the transmission buffer. A server creates the virtual reality content based on user's motion information, stores the virtual reality content in the transmission buffer and is allowed to modify the virtual reality content stored in the transmission buffer based on subsequently received user's motion information, so that the most recent user's motion information can be appropriately reflected in the virtual reality content. It is possible to provide a more immersive virtual reality service.

15 Claims, 7 Drawing Sheets

(56) References Cited

U.S. PATENT DOCUMENTS

2017/0330365 A1* 11/2017 Adamov ................ H04L 67/10
2017/0330382 A1* 11/2017 Adamov ............... G06T 15/205

* cited by examiner

IMAGE TILE

METHOD AND APPARATUS FOR BUFFER MANAGEMENT IN CLOUD BASED VIRTUAL REALITY SERVICES

BACKGROUND OF THE INVENTION

1. Field of the Invention

The present invention relates to content creation for a virtual reality service, and more particularly, to a method and apparatus for managing a buffer temporarily storing a content created in a virtual reality service based on a cloud.

2. Description of the Related Art

Virtual reality refers to a specific environment or situation created by a computer and, sometimes, refers to an interface between a person and a computer that makes the person facing an environment or situation created by the computer seem to be actually interacting with a specific environment or situation. This is to make it possible for the person to see and perform manipulation without directly experiencing the environment as if the person is entering the environment that the person hardly experiences in everyday life.

Providing the virtual reality service is delivering a virtual reality content to user's sensory organs so that the user can experience the virtual reality created by the computer. The computer creates the virtual reality in a form that can be detected by user's sensory organs such as visual, auditory, and tactile senses and transmits the virtual reality to the user.

On the other hand, the virtual reality is created by the computer reflecting the user's motion in real time. For example, in the case of a service that provides a user with 3D virtual reality, an image illustrating the 3D virtual reality world needs to be created in real time according to the user's line of vision. When the user is walking on a ramp, an image is created reflecting the tilt, and the user's walking speed is also reflected in the image. When the user suddenly turns the head, a virtual reality image needs to be created reflecting sudden change of line of vision.

For this reason, the user terminal collects user's motion information necessary for creating virtual reality through various sensors in real time, provides the user's motion information to a computer, and displays a virtual reality image created by a computer, so that it is possible to realize an immersive virtual reality.

In recent years, in the virtual reality service, a head mount display (HMD) is connected to a PC in a wireless or wired manner, so that a user is allowed to experience an immersive virtual reality content created by the PC through the HMD, or a user is allowed to experience an immersive a virtual reality content created by a smart phone or a separate embedded processing unit through an HMD connected to the smart phone or an HMD dedicated to virtual reality.

Meanwhile, in order to improve the immersion feeling of the virtual reality image that varies with the user's motion, it is necessary to create the virtual reality image reflecting the user's motion in real time. Therefore, in order to take advantage of the high-immersion virtual reality service, considerable computing power is required, and high-end PCs, smartphones, or virtual reality dedicated terminals are required.

As a result, there is a high initial cost for using the virtual reality service. In order to reduce the initial cost required for using the virtual reality service, a method of using a low-end user terminal or creating a virtual reality content in a cloud and providing the virtual reality content to the user terminal via a network has been proposed.

However, in the method of creating the virtual reality content in the cloud and providing the virtual reality content to the user terminals via the network, since it takes a relatively long time to transmit and receive the user's motion information and the contents between the server and the terminal, a problem of latency (time delay) occurs.

Hereinafter, a problem of latency occurring in a case where a virtual reality content is created and serviced in a cloud will be described with reference to FIGS. 1 and 2.

FIG. 1 is a block diagram illustrating that a server 100 creating a virtual reality content and a plurality of terminals 110, 120, and 160 using the virtual reality service are connected via a network. FIG. 2 is a graph illustrating latency occurring in a process of creating and transmitting a virtual reality content in a server.

Each terminal 110 (for example, a head mount display) may be equipped with various acceleration sensors capable of detecting user's motion such as acceleration sensors and/or sensors capable of detecting a biological signal such as user's brain wave or eye motion.

As illustrated in FIG. 2, the user's motion information detected by each terminal 110 is periodically transmitted to the server 100. The server 100 creates a virtual reality content to be displayed on the terminal 110 based on the received user's motion information and transmits the created virtual reality content to the corresponding terminal 110.

The latency occurring during creation, transmission, and reception of the motion information and creation, transmission, and reception of the contents between the terminal and the server in the cloud-based virtual reality service environment will be described with reference to FIG. 2.

The terminal 110 periodically creates the user's motion information and transmits the user's motion information to the server 100. For example, the terminal 110 is an HMD (Head Mount Display) worn by the user on the head, and the terminal 110 includes one or a plurality of sensors capable of detecting the motion of the user. The terminal 110 transmits information on the user's motion detected by the one or more sensors, that is, motion information, to the server 100 at regular time intervals.

The server 100 receives the user's first motion information (motion 1) transmitted by the terminal 110 at a time $t_0$ at a time $t_1$ and and creates or selects a plurality of image tiles for the virtual reality content to be displayed on the terminal 100 based on the received user's first motion information.

For the example, if the information that the user's head is turned by a predetermined angle the head counterclockwise is included in the user's first motion information (motion 1) transmitted at the time $t_0$, the server 100 receiving the information creates or selects a plurality of image tiles for the virtual reality content that are captured in the user's turned field of view.

The server 100 temporarily stores the created plurality of image tiles in the transmission buffer at a time $t_2$, and after that, the server 100 transmits the image tiles to the terminal 110 at a time $t_3$. The terminal 110 receives and decodes the plurality of image tiles at a time $t_4$ and displays the decoded image tiles at a time $t_5$.

In the above-described process, the amount of time T1+T2+T3+T4 corresponding to the latency occurring actually after the user's motion occurs until the image content reflecting the user's motion is created in the server 100 and displayed on the user terminal 110.

The time T1 constituting the latency is variable depending on an uplink channel network environment between the terminal 110 and the server 100. For example, the time T1 is variable depending on various causes such as an obstacle or a reflecting object between the server and the terminal, and the number of terminals sharing an upward channel.

The time T2 constituting the latency is variable depending on the utilization state of the resources (CPU, memory, and the like) of the server 100. The time T3 constituting the latency is variable depending on the downlink channel network environment between the server 100 and the server 110. The time T4 constituting the latency is variable depending on the performance of the terminal, but in general, the time T4 may be predicted to be a constant value over time in general.

As described above, the latency varies momentarily depending on the upward and downward network environments between the server 100 and the terminal 110 as well as the utilization state of the resources of the server. The greater the latency, the lower the immersion feeling of the virtual reality service. In addition, as the motion difference between the user's first motion information (motion 1) and the user's second motion information (motion 2) or the subsequent motion information increases, the immersion feeling of the virtual reality is further degraded.

SUMMARY OF THE INVENTION

The present invention is to provide a method and an apparatus for managing a transmission buffer so that the user's second motion information or the subsequent motion information can be appropriately reflected in a plurality of image tiles stored in the transmission buffer after the plurality of image tiles are created based on the user's first motion information and temporarily stored in the transmission buffer.

According to an aspect of the present invention, there is provided a buffer management method for a cloud-based virtual reality service, including: allowing a server to periodically receive user's motion information from a user terminal via a network; allowing the server to calculate user's first viewpoint based on user's first motion information among the received user's motion information; allowing the server to create or select a plurality of image tiles with respect to a content to be displayed on the user terminal based on the first viewpoint and to store the image tiles in a transmission buffer; allowing the server to transmit the plurality of image tiles to the user terminal via the network; allowing the server to calculate user's second viewpoint based on user's second motion information subsequent to the first motion information among the received user's motion information; comparing a difference between the first viewpoint and the second viewpoint with a predetermined value; and modifying the plurality of image tiles stored in the transmission buffer based on the second viewpoint if the difference between the first viewpoint and the second viewpoint is equal to or larger than the predetermined value.

In the above aspect, the server additionally creates or selects an image tile with respect to the content to be displayed on the user terminal based on the second viewpoint and stores the image tile in the transmission buffer.

In the above aspect, an image tile that is not consistent with the second viewpoint among the plurality of image tiles created or selected based on the first viewpoint is deleted from the transmission buffer.

According to an aspect of the present invention, there is provided a buffer management method for a cloud-based virtual reality service including: allowing a server to periodically receive user's motion information from a user terminal via a network; allowing the server to calculate user's first viewpoint based on user's first motion information among the received user's motion information; allowing the server to create or select a plurality of image tiles with respect to a content to be displayed on the user terminal based on the first viewpoint; allowing the server to calculate distances from the first viewpoint to the plurality of image tiles and storing the plurality of image tiles in the transmission buffer in ascending order of distances; and allowing the server to transmit the plurality of image tiles to the user terminal via the network in storage order of the plurality of image tiles.

In the above aspect, the buffer management method further includes: allowing the server to calculate user's second viewpoint based on the user's second motion information subsequent to the user's first motion information among the received user's motion information; comparing a difference between the first viewpoint and the second viewpoint with a predetermined value; and modifying the plurality of image tiles stored in the transmission buffer based on the second viewpoint if the difference between the first viewpoint and the second viewpoint is equal to or larger than the predetermined value.

In the above aspect, distances from the second viewpoint to the plurality of image tiles are calculated, the storage order of the plurality of image tiles is modified according to a result of the calculation.

In the above aspect, the server additionally creates or selects an image tile with respect to the content to be displayed on the user terminal based on the second viewpoint and stores the image tile in the transmission buffer.

In the above aspect, an image tile that is not consistent with the second viewpoint among the plurality of image tiles created or selected based on the first viewpoint is deleted from the transmission buffer.

As described above, according to various embodiments of the present invention, in a cloud-based virtual reality service environment, a buffer management method and apparatus capable of modifying an image tile created based on user's motion and stored in a transmission buffer so as to be consistent with subsequent user's motion are provided, so that it is possible to provide a more reliable and immersive virtual reality service.

DETAILED DESCRIPTION

Figure 1:
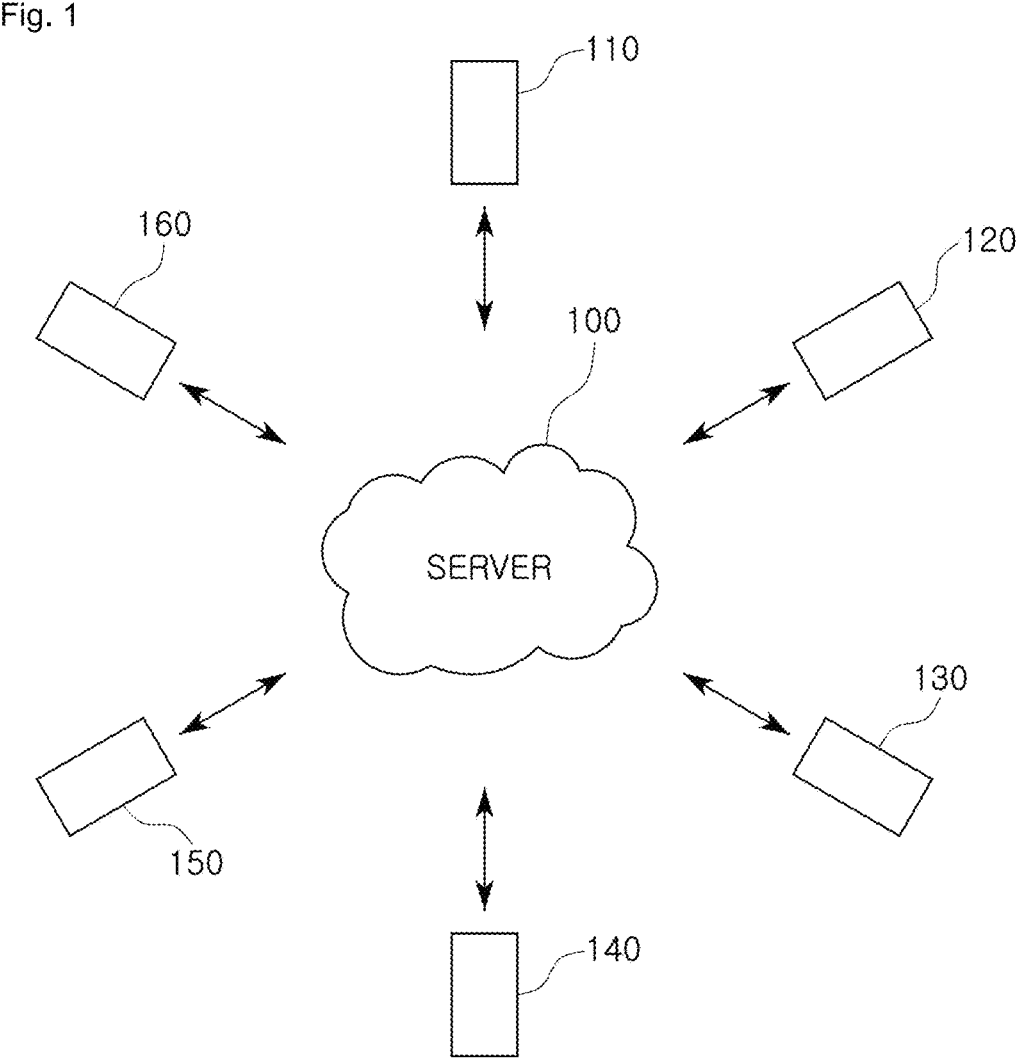
FIG. 1 is a block diagram illustrating that a server creating a virtual reality content and a plurality of terminals using the virtual reality service are connected via a network.
Figure 2:
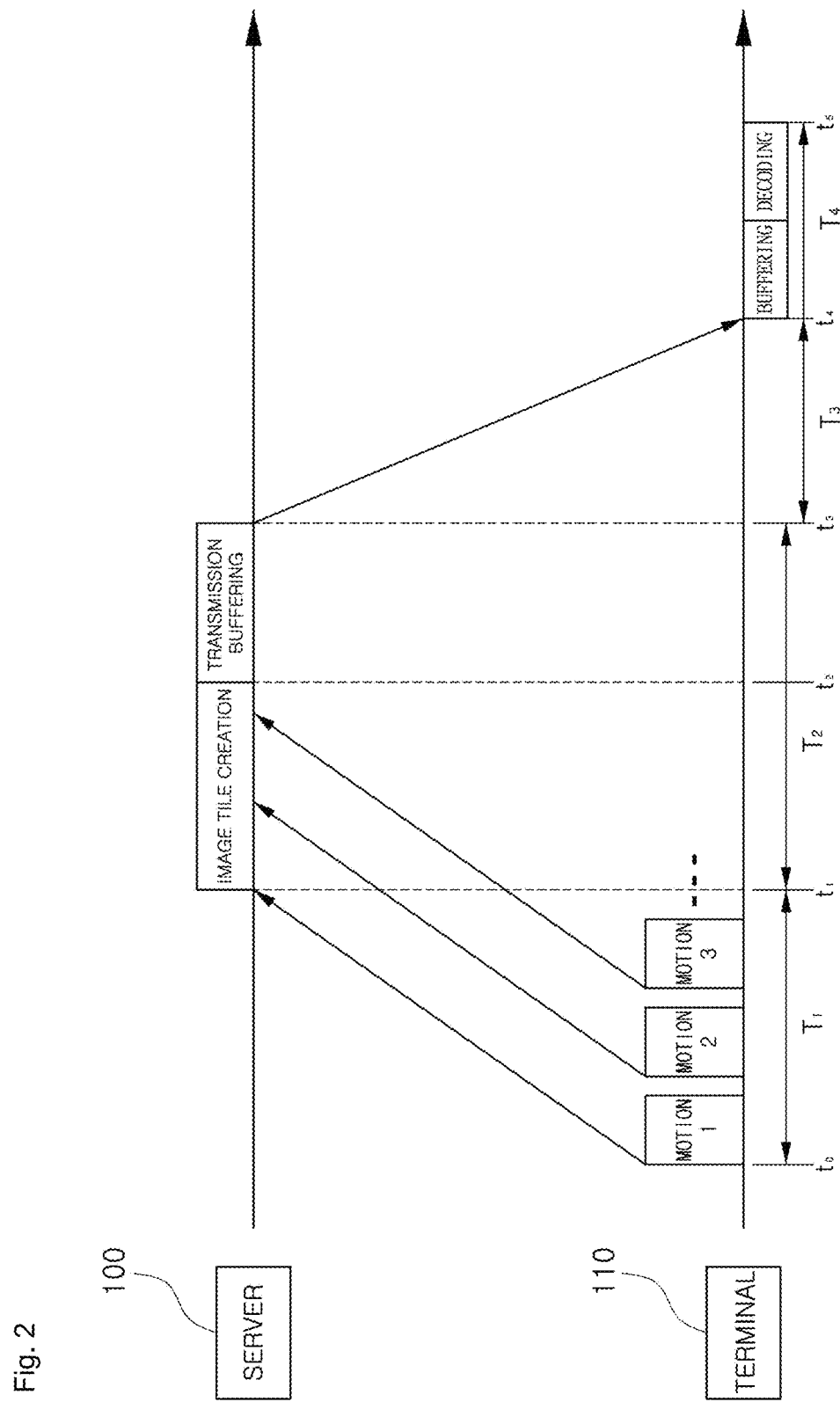
FIG. 2 is a graph illustrating latency occurring in a process of creating and transmitting a virtual reality content in a server.

The advantages and features of the embodiments disclosed herein and the method of accomplishing the advantages and features will become apparent from the embodiments described below with reference to the accompanying drawings. However, the invention is not limited to the disclosed embodiments, but may be embodied in many different forms and should not be construed as limited to the embodiments set forth herein, but the embodiments are provided in order to completely inform the skilled in the related art of the scope of the embodiments.

The terms used in this specification will be described in brief, and the disclosed embodiments will be described in detail.

With respect to terms used herein, the terms generally and widely used at present should be employed taking into account the functionality of the disclosed embodiments. However, the terms may vary depending on the intent or circumstance of the skilled in the related art, the precedents, the emergence of new technology, or the like. In addition, in specific cases, there may be a term chosen arbitrarily by the applicant, in which case the meaning is to be described in detail in the detailed description of the specification. Accordingly, the terms used in the present disclosure should be defined based on the meanings of the terms, not on the names of the terms, but on the entire contents of the specification.

The singular expressions herein include plural expressions unless the context clearly dictates otherwise.

The expression that a certain portion throughout the specification "includes" denotes that any other components can be further included without specific disclosure that other components are excluded. In addition, the term "unit" used in the specification denotes a hardware component such as software, FPGA or ASIC, and the "unit" has a certain role. However, the "unit" is not meant to be limited to software or hardware. The "unit" may be configured to reside on an addressable storage medium or may be configured to reproduce one or more processors. Therefore, as an example, the "units" include components such as software components, object oriented software components, class components, and task components, processes, functions, attributes, procedures, subroutines, segments of program codes, drivers, firmware, microcodes, circuitry, data, databases, data structures, tables, arrays, and variables. The functions provided in components and "units" may be combined into a smaller number of components and "units" or further divided into additional components and "units".

Hereinafter, embodiments of the present invention will be described in detail with reference to the accompanying drawings so that those skilled in the art can easily carry out the present invention. In order to clearly explain the present invention in the drawings, portions not related to the description will be omitted.

Figure 3:
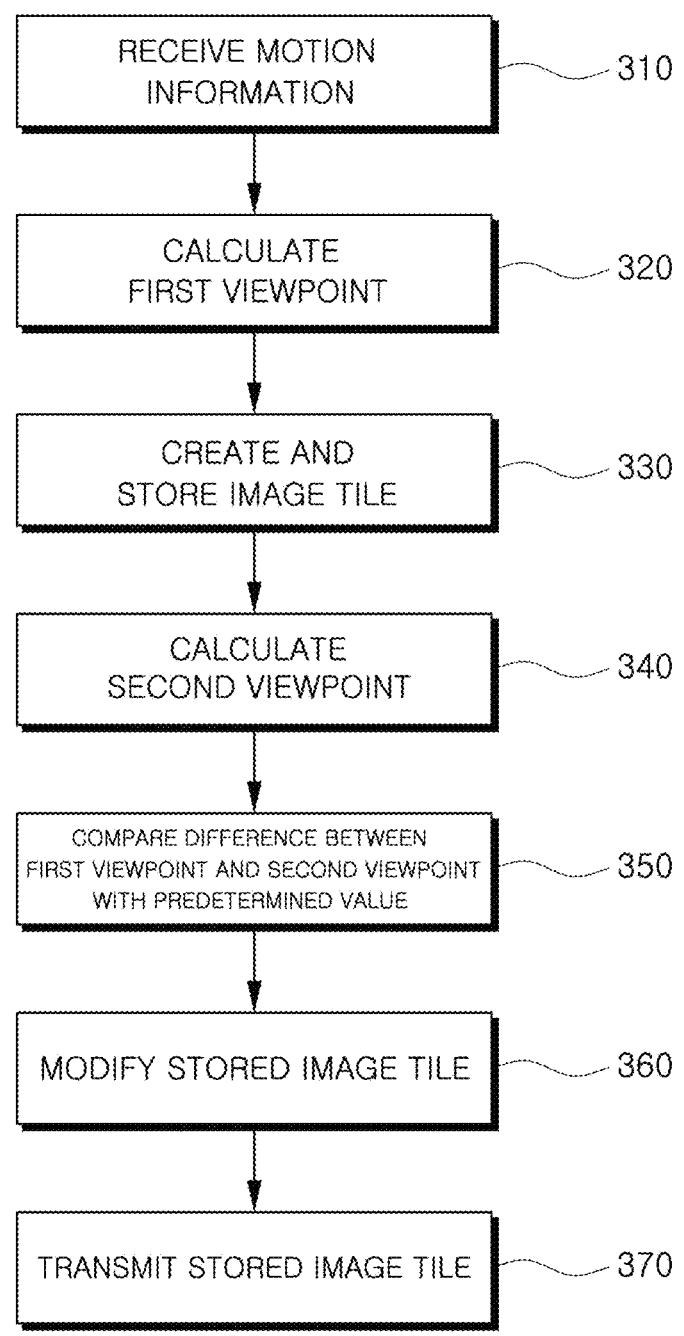
FIG. 3 is a block diagram illustrating a buffer management method for a cloud-based virtual reality service according to an embodiment of the present invention.
Figure 4:
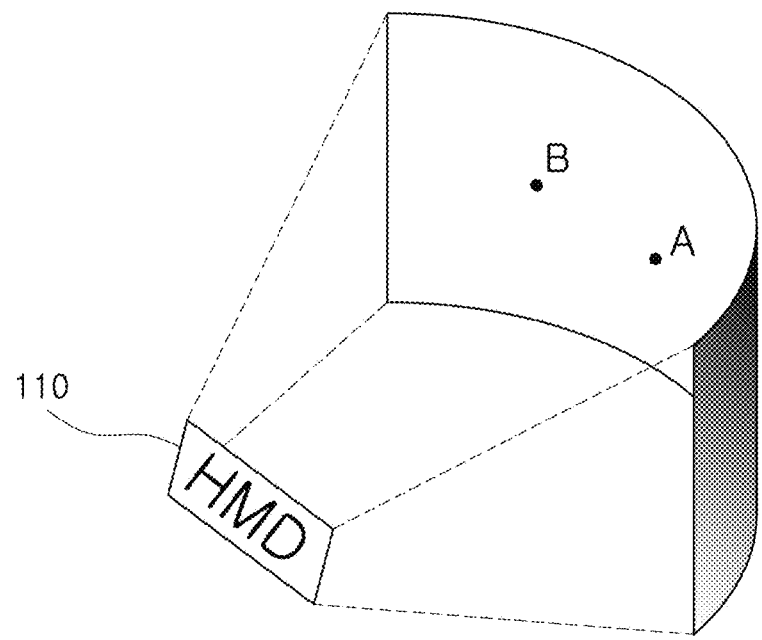
FIG. 4 is a diagram illustrating user's field of view and user's viewpoint according to a position of a user terminal.

Referring to FIGS. 3 and 4, a buffer management method for a cloud-based virtual reality service according to an embodiment of the present invention is described. According to FIG. 3, in step 310, a server 100 periodically receives user's motion information from a user terminal 110.

For example, a user terminal (HMD) is equipped with one or more position sensors and acceleration sensors, through which user's head position is periodically detected. The user terminal periodically transmits the detected user's motion information, and the server 100 receives the user's motion information (motion 1, motion 2, motion 3, . . . ).

In step 320, the server 100 calculates a first viewpoint based on the received first motion information (motion 1). From the position of the user's head extracted from the first motion information (motion 1), the user's field of view can be calculated as illustrated in FIG. 4, and the center A of the user's field of view may be estimated as the first viewpoint.

As another example, in a case where an eye-tracking sensor is mounted in the user terminal (HMD), as a result of the eye tracking, the viewpoint (B) that the user is looking actually may be calculated as the first viewpoint.

In step 330, the server 100 creates and selects a plurality of image tiles for a video content consistent with the user's field of view calculated from the first motion information (motion 1), that is, the position of the user's head and stores the plurality of image tiles in the transmission buffer.

In step 340, the server 100 calculates a second viewpoint based on the second motion information (motion 2). The method of calculating the second viewpoint is the same as calculating the first viewpoint. The step 340 of calculating the second viewpoint may be performed in time overlapping with the step 330 of creating and storing the plurality of image tiles.

In step 350, the server 100 compares a difference between the first viewpoint and the second viewpoint with a predetermined value. In step 360, if the difference between the first viewpoint and the second viewpoint is equal to or larger than the predetermined value, the server 100 modifies the plurality of image tiles stored in the transmission buffer.

For example, if the coordinates of the first viewpoint are denoted by (x1, y1) and the coordinates of the second viewpoint are denoted by (x2, y2), then the difference between the first viewpoint and the second viewpoint can be expressed as $|(x1, y1)-(x2, y2)|$.

On the other hand, if the width of one image tile is denoted by W and the length is denoted by H, the predetermined value can be expressed by $a*|(W, H)|$ ("a" is an arbitrary positive real number) as a relative magnitude with respect to one image tile. "a" may be set freely within a range that is considered to be capable of interfering with the immersion feeling of the user.

At this time, if $|(x1, y1)-(x2, y2)|>=a*|(W, H)|$, a plurality of image tiles stored in the transmission buffer are created based on the user's first viewpoint. However, if the image tiles are transmitted and displayed to the user terminal as they are, a degree of inconsistency with the user's second viewpoint or subsequent viewpoints according to the user's subsequent motion deviates from a predetermined range, so that it may be determined that the user feels a sense of incongruity.

Accordingly, in this case, in the buffer management method for a cloud-based virtual reality service according to the embodiment of the present invention, the plurality of image tiles stored in the transmission buffer is modified so as to be consistent with the user's second viewpoint. If the difference between the first viewpoint and the second viewpoint is less than a predetermined value, the plurality of image tiles stored in the transmission buffer are not modified.

In another embodiment of the present invention, in this case, the third viewpoint may be calculated based on the user's third motion information (motion 3), it may be determined whether or not the difference between the first viewpoint and the third viewpoint is equal to or larger than a predetermined value, and the image tile stored in the transmission buffer may be modified in accordance with the result. In other words, steps 340, 350, and 360 may be performed repeatedly with respect to the subsequent user's motion information.

In step 370, the server 100 transmits a plurality of modified image tiles to the user terminal 110.

On the other hand, in step 360, various methods of modifying the plurality of image tiles stored in the transmission buffer may be variously considered.

For example, after the user terminal 110 transmits the first motion information, the user turns the head 5 degrees to the right, and the second motion information reflects the head rotation. In this case, in addition to the image tiles stored in the transmission buffer (the image tiles created based on the user's first viewpoint), the image tiles corresponding to the field of view required according to the rightward turning of the user's head. That is, the image tiles consistent with the user's second viewpoint may be additionally created and stored in the transmission buffer.

In the above example, among the plurality of image tiles stored in the transmission buffer, the image tiles that deviate from the user's field of view as the user's head is turned to the right need not be displayed on the user terminal any more, and thus, it is preferable to delete the image tiles from the transmission buffer. By doing so, it is possible to prevent network resources from being consumed in transmission of unnecessary image tiles.

On the other hand, human visual cognition ability is significantly weakened as the distance from the viewpoint of the eyes increases. That is, the image tiles in a region close to the user's viewpoint can be clearly recognized by the user, whereas the image tiles in a region far from the user's viewpoint are relatively not clearly recognized by the user.

Therefore, when the image tile created based on the user's viewpoint is transmitted to the user terminal, if the image tiles are stored and transmitted in a specific order in consideration of the human visual cognition ability described above, limited resources can be more efficiently used, so that it is possible to provide a highly immersive virtual reality service.

Figure 5:
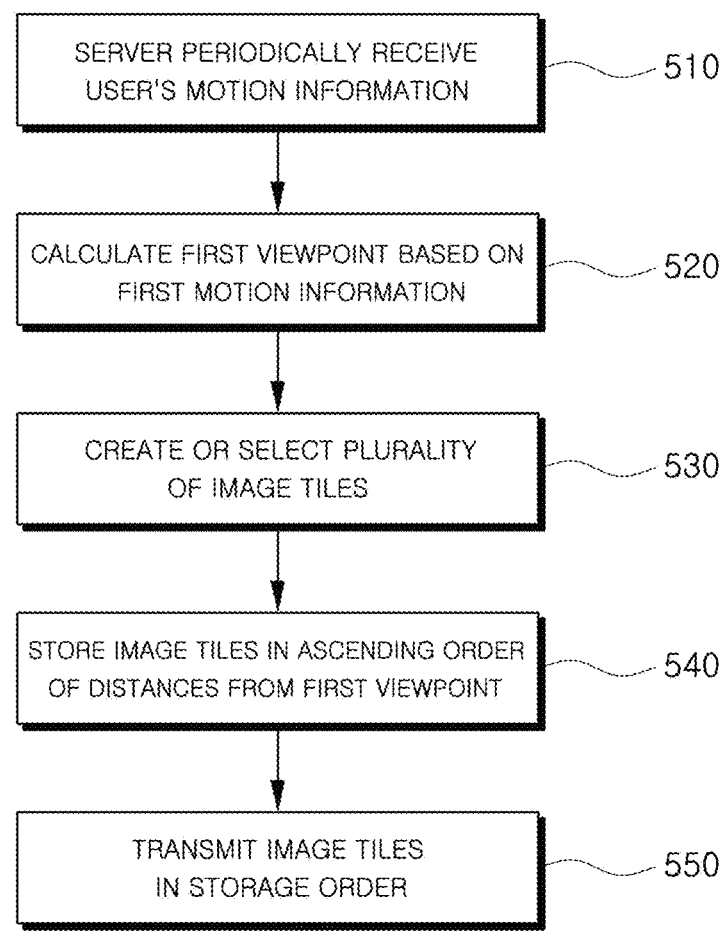
FIG. 5 is a block diagram illustrating a buffer management method for a cloud-based virtual reality service according to another embodiment of the present invention.

Hereinafter, a buffer management method for a cloud-based virtual reality service according to another embodiment of the present invention will be described with reference to FIGS. 5 and 6.

In step 510, the server 100 periodically receives user's motion information from the user terminal 110 via the network. In step 520, the server 100 calculates the user's first viewpoint based on the first motion information among the received user's motion information. The method of calculating the viewpoint based on the motion information is the same as described above.

In step 530, the server 100 creates or selects a plurality of image tiles for a content to be displayed on the user terminal 110 based on the first viewpoint.

In step 540, the server 100 calculates the distances from the first viewpoint to the plurality of image tiles and stores the plurality of image tiles in the transmission buffer in ascending order of the distances.

Figure 6:
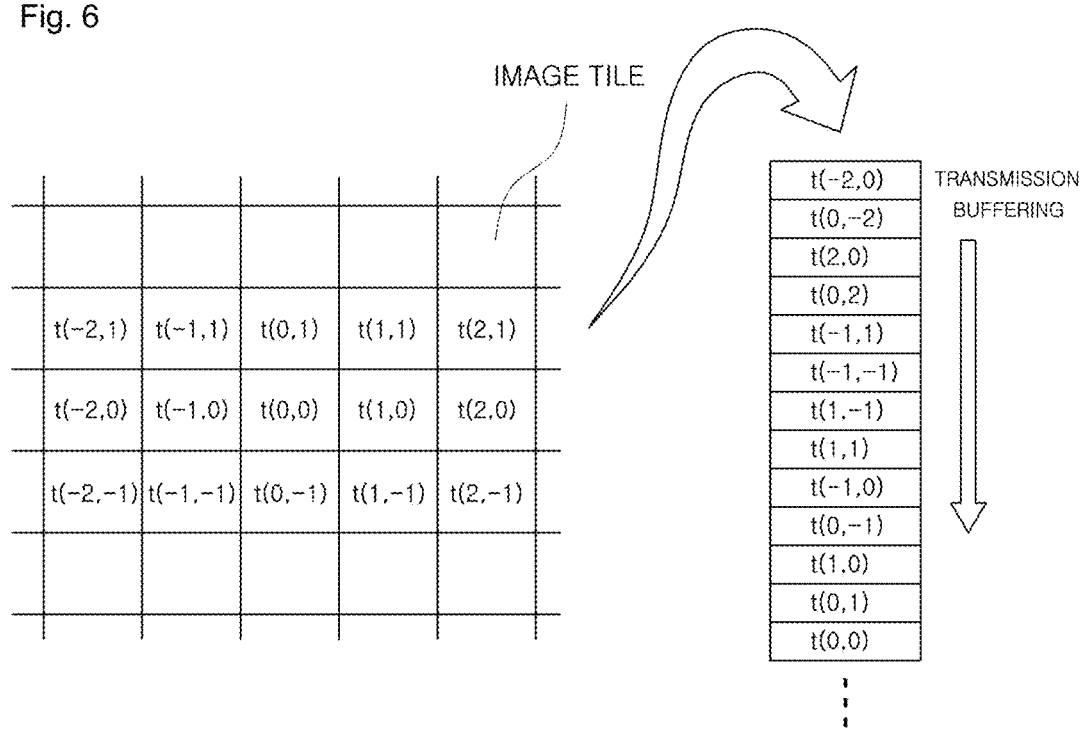
FIG. 6 is a diagram illustrating a storage order of a plurality of image tiles in the buffer management method illustrated in FIG. 5.

For example, FIG. 6 illustrates an example in which, in a case where the user's first viewpoint is located at the center of an image tile t(0,0), the image tiles are stored in the buffer in ascending order of the distances from the first viewpoint to the image tiles.

In FIG. 6, since the user's first viewpoint is located at the center of the image tile t(0,0), the image tile located at the closest distance from the first viewpoint is the image tile t(0,0). Therefore, the image tile stored in the transmission buffer in the first order becomes the image tile t(0,0).

The image tiles located at the second closest distance from the user's first viewpoint are the image tiles t(0,1), t(1,0), t(0,1), and t(−1,0). Therefore, these image tiles are stored in the transmission buffer in the second order.

The image tiles located at the third shortest distance from the user's first viewpoint are image tiles t(1,1), t(1,−1), t(−1,−1), and t(−1,1). Therefore, these image tiles are stored in the transmission buffer in the third order.

As described above, the process of calculating the distances from the user's first viewpoint to the image tiles and storing the image tiles in the transmission buffer in ascending order of the distances is be repeated until all the image tiles created based on the user's first viewpoint are stored in the transmission buffer.

In step 550, the server 100 transmits the plurality of image tiles to the user terminal 110 in the storage order of the image tiles stored in the transmission buffer.

In this manner, if the image tiles close to the user's viewpoint are preferentially stored and transmitted to transmit the user terminal 110, even before all the image tiles corresponding to one frame to be displayed on the user terminal 110 are transmitted, it is possible to construct and display a current frame by using the preferentially transmitted image tiles close to the user's viewpoint and the image tiles used for the previous frame.

Although the image tiles used for the previous frame are re-used instead of the image tiles far from the user's viewpoint, the user cannot clearly recognize the re-using, and thus, the user can be immersed in the virtual reality without feeling any sense of incongruity.

According to another embodiment of the present invention, the step in which the server 100 calculates the second viewpoint based on second motion information and compares the difference between the first viewpoint and the second viewpoint with the predetermined value is further included. If the difference between the first viewpoint and the second viewpoint is equal to or larger than the predetermined value, the plurality of image tiles stored in the transmission buffer can be modified based on the second viewpoint.

According to still another embodiment of the present invention, if the difference between the first viewpoint and the second viewpoint is equal to or larger than the predetermined value, the storage order of the plurality of image tiles stored in the transmission buffer can be modified.

Figure 7:
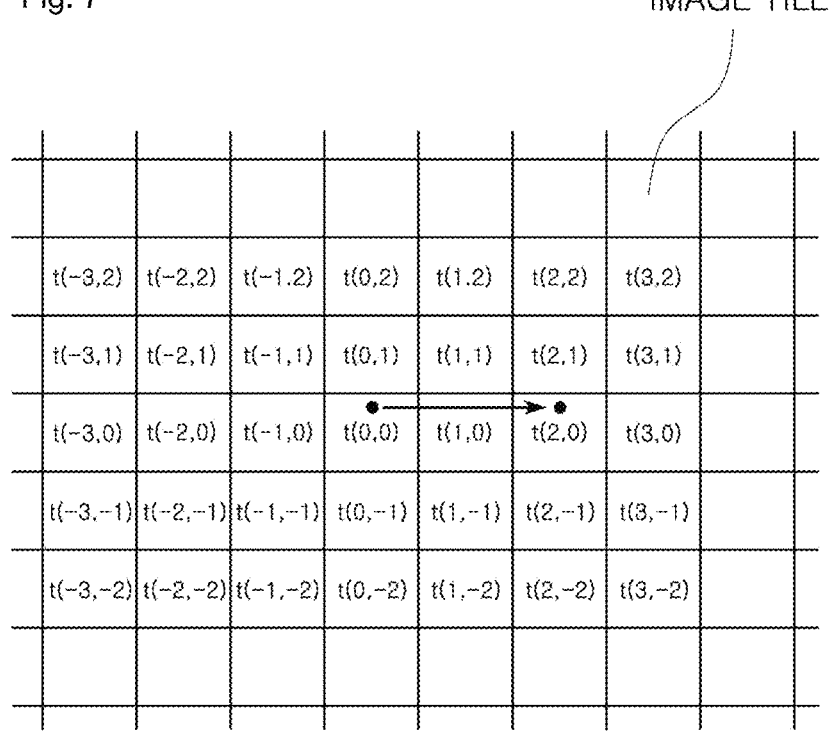
FIG. 7 is a diagram illustrating a method of modifying the storage order of the plurality of image tiles so as to be consistent with a second viewpoint in the buffer management method illustrated in FIG. 5.

As illustrated in FIG. 7, in a case where the user's first viewpoint is located at the center of an image tile t(0,0) and the user's second viewpoint is located at the center of an image tile t(2,0), since the difference between the two viewpoints is equal to or larger than a predetermined value, for example, a width W of one image tile, the server 100 can modify the storage order of the plurality of image tiles stored in the transmission buffer.

At this time, the storage order of the image tiles to be newly stored is the ascending order of the distances from the user's second viewpoint to the image tiles. That is, the image tile t(2,0) is stored in the transmission buffer with the first priority. Accordingly, the server 100 transmits the image tile t(2,0) to the user terminal 110 with the first priority.

In a case where the difference between the first viewpoint and the second viewpoint is equal to or larger than the predetermined value, various methods of modifying the plurality of image tiles stored in the transmission buffer may be considered.

For example, after the user terminal 110 transmits the first motion information, if the user's head is turned to the left and the second motion information reflects the turning, the image tiles corresponding to the user's field of view required for the leftward turning of the user's head can be additionally stored in addition to the the image tiles (created based on the user's first viewpoint) stored in the transmission buffer. That is, the image tiles consistent with the user's second viewpoint may be additionally created and stored in the transmission buffer.

With respect to the image tiles that are additionally created, the distances from the second viewpoint are calculated, and the storage order of the image tiles can be determined according to the distances.

On the other hand, among the plurality of image tiles stored in the transmission buffer, the image tiles that deviate from the user's field of view as the user's head is turned to the left need not to be displayed on the user terminal any more, and thus, the image tiles can be deleted from the transmission buffer.

Figure 8:
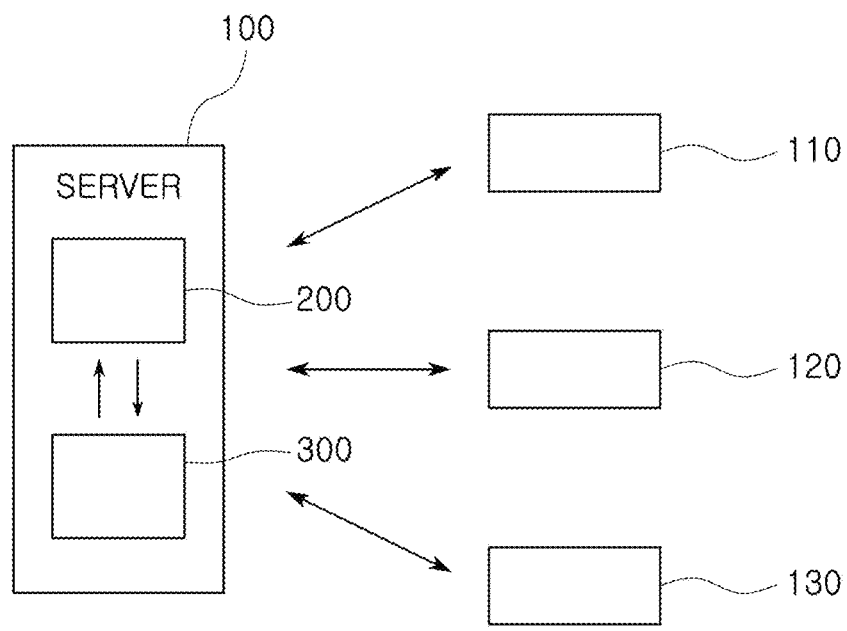
FIG. 8 illustrates a cloud-based virtual reality service system in which a server including a microprocessor and a transmission buffer communicates with a user terminal via a network.

FIG. 8 illustrates a cloud-based virtual reality service system in which a server 100 including a microprocessor 200 and a transmission buffer 300 communicates with user terminals 110, 120, and 130 via a network.

In another embodiment of the present invention, there is provided a buffer management apparatus for a cloud-based virtual reality service comprising a server receiving user's motion information periodically transmitted from a user terminal, creating or selecting a content to be displayed on the user terminal based on the user's motion information, and transmitting the created content to the user terminal, the server including one or a plurality of microprocessors and a transmission buffer, wherein the one or plurality of microprocessors: calculates user's first viewpoint based on first motion information among received user's motion information; creates or selects a plurality of image tiles with respect to a content to be displayed on the user terminal based on the first viewpoint and stores the created image tiles in the transmission buffer; calculates user's second viewpoint based on second motion information subsequent to the first motion information among the received user's motion information; compares a difference between the first viewpoint and the second viewpoint with a predetermined value; and modifies the plurality of image tiles stored in the transmission buffer based on the second viewpoint if the difference between the first viewpoint and the second viewpoint is equal to or larger than the predetermined value.

In still another embodiment of the present invention, there is provided a buffer management apparatus for a cloud-based virtual reality service comprising a server receiving user's motion information periodically transmitted from a user terminal, creating or selecting a content to be displayed on the user terminal based on the user's motion information, and transmitting the created content to the user terminal, the server including one or a plurality of microprocessors and a transmission buffer, wherein the one or plurality of microprocessors: calculate user's first viewpoint based on first motion information among received user's motion information; create or select a plurality of image tiles with respect to a content to be displayed on the user terminal based on the first viewpoint; and calculate distances from the first viewpoint to the plurality of image tiles and store the plurality of image tiles in the transmission buffer in ascending order of the distances, and wherein the server transmits the plurality of image tiles to the user terminal via a network in storage order.

While the embodiments of the present invention have been described with reference to FIGS. 1 to 8, the present invention is not limited to these embodiments, and various modifications can be made.

What is claimed is:

1. A buffer management method performed by a server to provide a cloud-based virtual reality service, comprising:
periodically receiving user's motion information from a user terminal via a network;
calculating user's first viewpoint based on user's first motion information among the received user's motion information;
determining a plurality of image tiles corresponding to a content to be displayed on the user terminal based on the first viewpoint;
storing the plurality of image tiles in a transmission buffer;
transmitting the plurality of image tiles to the user terminal via the network;
calculating user's second viewpoint based on user's second motion information subsequent to the first motion information among the received user's motion information;
comparing a difference between the first viewpoint and the second viewpoint with a predetermined value; and
modifying the plurality of image tiles stored in the transmission buffer based on the second viewpoint if the difference between the first, viewpoint and the second viewpoint is equal to or larger than the predetermined value.

2. The buffer management method according to claim 1, wherein the modifying comprises additionally creating or selecting an image tile corresponding to the content to be displayed on the user terminal based on the second viewpoint and stores the image tile in the transmission buffer.

3. The buffer management method according to claim 1, wherein the modifying comprise deleting an image tile that is not consistent with the second viewpoint among the plurality of image tiles created or selected based on the first viewpoint from the transmission buffer.

4. A buffer management method performed by a server to provide a cloud-based virtual reality service, comprising:
periodically receiving user's motion information from a user terminal via a network;
calculating user's first viewpoint based on user's first motion information among the received user's motion information;
determining a plurality of image tiles with corresponding to a content to be displayed on the user terminal based on the first viewpoint;
calculating distances from the first viewpoint to the plurality of image tiles;
storing the plurality of image tiles in a transmission buffer in ascending order of distances; and
transmitting the plurality of image tiles to the user terminal via the network in storage order of the plurality of image tiles.

5. The buffer management method according to claim 4, further comprising:
calculating user's second viewpoint based on user's second motion information subsequent to the user's first motion information among the received user's motion information;

comparing a difference between the first viewpoint and the second viewpoint with a predetermined value; and modifying the plurality of image tiles stored in the transmission buffer based on the second viewpoint if the difference between the first viewpoint and, the second viewpoint is equal to or larger than the predetermined value.

6. The buffer management method according to claim 5, wherein the modifying comprises calculating distances from the second viewpoint to the plurality of image tiles, and modifying the storage order of the plurality of image tiles according to a result of the calculation.

7. The buffer management method according to claim 5, wherein the modifying comprises additionally creating or selecting an image tile corresponding to the content to be displayed on the user terminal based on the second viewpoint and storing the image tile in the transmission buffer.

8. The buffer management method according to claim 7, wherein the modifying comprises deleting an image tile that is not consistent with the second viewpoint among the plurality of image tiles created or selected based on the first viewpoint from the transmission buffer.

9. A server apparatus for providing a cloud-based virtual reality service, comprising:
a transmission buffer; and
one or plurality of microprocessors configured to:
calculate user's first viewpoint based on first motion information among user's motion information periodically received from a user's terminal;
determine a plurality of image tiles corresponding to a content to be displayed on a user terminal based on the first viewpoint;
store the plurality of image tiles in the transmission buffer;
calculate user's second viewpoint based on second motion information subsequent to the first motion information among the user's motion information periodically received from the user's terminal;
compare a difference between the first viewpoint and the second viewpoint with a predetermined value; and
modify the plurality of image tiles stored in the transmission buffer based on the second viewpoint if the difference between the first viewpoint and the second viewpoint is equal to or larger than the predetermined value.

10. The server apparatus according to claim 9, wherein the one or plurality of microprocessors additionally create or select an image tile corresponding to the content to be displayed on the user terminal based on the second viewpoint and store the created image tile in the transmission buffer.

11. The server apparatus according to claim 9, wherein the one or plurality of microprocessors delete an image tile that is not consistent with the second viewpoint among the plurality of image tiles corresponding to the first viewpoint from the transmission buffer.

12. A server apparatus for providing a cloud-based virtual reality service comprising:
a transmission buffer; and
one or plurality of microprocessors configured to:
calculate user's first viewpoint based on first motion information among user's motion information periodically received from a user's terminal;
determine a plurality of image tiles corresponding to a content to be displayed on a user terminal based on the first viewpoint;
calculate distances from the first viewpoint to the plurality of image tiles;
store the plurality of image tiles in the transmission buffer in ascending order of the distances; and
transmit the plurality of image tiles to the user terminal via a network in storage order of the plurality of image tiles.

13. The server apparatus according to claim 12, wherein the one or plurality of microprocessors:
calculate user's second viewpoint based on second motion information subsequent to first motion information among the user's motion information periodically received from the user's terminal;
compare a difference between, the first viewpoint and the second viewpoint with a predetermined value; and
modify the plurality of image tiles stored in the transmission buffer based on the second viewpoint if the difference between the first viewpoint and the second viewpoint is equal to or larger than the predetermined value.

14. The server apparatus according to claim 13, wherein the one or plurality of microprocessors calculate distances from the second viewpoint to the plurality of image tiles and modify the storage order of the plurality of image tiles according to a result of the calculation.

15. The server apparatus according to claim 13, wherein the one or plurality of microprocessors:
additionally create or select an image tile corresponding to the content to be displayed on the user terminal based on the second viewpoint and store the image tile in the transmission buffer; and
delete an image tile that is not consistent with the second viewpoint among the plurality of image tiles created or selected based on the first viewpoint from the transmission buffer.

* * * * *